US011085565B2

(12) United States Patent
Tajiri et al.

(10) Patent No.: US 11,085,565 B2
(45) Date of Patent: Aug. 10, 2021

(54) GIMBALED FLEXURE FOR SPHERICAL FLEX JOINTS

(71) Applicant: Unison Industries, LLC, Jacksonville, FL (US)

(72) Inventors: Gordon Tajiri, Allentown, PA (US); Michael Thomas Kenworthy, Gilbert, AZ (US); Dattu GV Jonnalagadda, Ponnur (IN); Jason L. Burdette, Beavercreek, OH (US)

(73) Assignee: Unison Industries, LLC, Jacksonville, FL (US)

( * ) Notice: Subject to any disclaimer, the term of this patent is extended or adjusted under 35 U.S.C. 154(b) by 813 days.

(21) Appl. No.: 15/406,123

(22) Filed: Jan. 13, 2017

(65) Prior Publication Data
US 2018/0202589 A1 Jul. 19, 2018

(51) Int. Cl.
F16L 27/02 (2006.01)
F16L 27/08 (2006.01)
F02C 7/00 (2006.01)
F04D 27/00 (2006.01)

(52) U.S. Cl.
CPC ............ F16L 27/02 (2013.01); F02C 7/00 (2013.01); F04D 27/009 (2013.01); F16L 27/0857 (2013.01)

(58) Field of Classification Search
CPC ..... F16L 27/02; F16L 27/023; F16L 27/0857; F16L 27/111; F16L 27/08; F16L 27/0804; F16L 27/107; F16L 27/108; F16L 27/11
See application file for complete search history.

(56) References Cited

U.S. PATENT DOCUMENTS

| 390,240 | A | * | 10/1888 | Legat | F16L 27/00 285/55 |
| 1,165,449 | A | * | 12/1915 | Rietz | F16L 27/11 285/226 |
| 2,901,272 | A | * | 8/1959 | Andersen | F16L 27/0857 285/227 |
| 4,643,463 | A | | 2/1987 | Hailing et al. | |
| 4,893,847 | A | | 1/1990 | Hess | |

(Continued)

FOREIGN PATENT DOCUMENTS

CN 103697266 A 4/2014
EP 0504384 B1 7/1996
(Continued)

OTHER PUBLICATIONS

Extended European Search Report and Opinion issued in connection with corresponding EP Application No. 18151417.5 dated Jun. 5, 2018.
(Continued)

Primary Examiner — Matthew Troutman
Assistant Examiner — James A Linford
(74) Attorney, Agent, or Firm — Dority & Manning, P.A.

(57) ABSTRACT

A flexible joint assembly for a joint between a first duct and a second duct for providing a flow of fluid, such as bleed air in an aviation implementation. The flexible joint includes a bellows supported by a mounting assembly having a first support and a second support, each surrounding a portion of the bellows. A set of flexures provided on a joint ring of the joint assemblies can operably couple the first support and the second support.

19 Claims, 14 Drawing Sheets

(56) References Cited

U.S. PATENT DOCUMENTS

| | | | |
|---|---|---|---|
| 5,280,968 A | 1/1994 | Moore et al. | |
| 6,056,329 A | 5/2000 | Kitani et al. | |
| 6,282,887 B1 | 9/2001 | Polushin et al. | |
| 6,493,952 B1 | 12/2002 | Kousek et al. | |
| 7,040,666 B2 | 5/2006 | Christianson et al. | |
| 8,734,043 B2 | 5/2014 | Jeandot et al. | |
| 9,163,762 B2 * | 10/2015 | French | F16L 27/0857 |
| 2002/0041095 A1 | 4/2002 | Shin | |
| 2009/0309355 A1 | 12/2009 | Turfait et al. | |
| 2014/0265310 A1 | 9/2014 | Halkyard et al. | |

FOREIGN PATENT DOCUMENTS

| | | | |
|---|---|---|---|
| EP | 0870965 B1 | 3/2002 | |
| EP | 1 484 495 A2 | 12/2004 | |
| EP | 0950873 B1 | 2/2007 | |
| EP | 1964778 B1 | 4/2010 | |
| EP | 1484495 B1 | 10/2013 | |
| GB | 2157383 A * | 10/1985 | F16L 27/02 |
| GB | 2157384 A * | 10/1985 | F16L 27/02 |
| GB | 2 170 567 A | 8/1986 | |
| JP | 61260117 A | 11/1986 | |
| JP | 62288718 A | 12/1987 | |
| JP | 05503761 A | 6/1993 | |
| JP | 065116 B2 | 1/1994 | |
| JP | 10281369 A | 10/1998 | |
| JP | 11295069 A | 10/1999 | |
| JP | 2004360919 A | 12/2004 | |
| JP | 2008209001 A | 9/2008 | |
| WO | 9207211 A1 | 4/1992 | |

OTHER PUBLICATIONS

Japanese Office Action, With Machine Translation, for Counterpart JP2017-250361, dated March 19, 2019.

* cited by examiner

GIMBALED FLEXURE FOR SPHERICAL FLEX JOINTS

BACKGROUND OF THE INVENTION

Turbine engines, and particularly gas or combustion turbine engines, are rotary engines that extract energy from a flow of combusted gases passing through the engine in a series of compressor stages, which include pairs of rotating blades and stationary vanes, through a combustor, and then onto a multitude of turbine stages, also including multiple pairs of rotating blades and stationary vanes.

Duct assemblies are provided about the turbine engine and provide conduits for the flow of various operating fluids to and from the turbine engine. One of the operating fluids is bleed air. In the compressor stages, bleed air is produced and taken from the compressor via feeder ducts. Bleed air from the compressor stages in the gas turbine engine can be utilized in various ways. For example, bleed air can provide pressure for the aircraft cabin, keep critical parts of the aircraft ice-free, or can be used to start remaining engines. Configuration of the feeder duct assembly used to take bleed air from the compressor requires rigidity under dynamic loading, and flexibility under thermal loading. Current systems use ball-joints or axial joints in the duct to meet requirements for flexibility, which compromise system dynamic performance and increase the weight of the system.

BRIEF DESCRIPTION OF THE INVENTION

In one aspect, the present disclosure relates to a duct assembly for a gas turbine engine including a first duct and a second duct. A flexible joint assembly couples the first duct to the second duct. The flexible joint assembly further includes a bellows having a first end and a second end, with convolutions located between the ends. The flexible joint assembly further includes a gimbaled joint assembly including a first support surrounding the first end of the bellows and a portion of the convolutions and a second support surrounding the second end of the bellows and a portion of the convolutions. The gimbaled joint assembly further includes a gimbal ring assembly operably coupled to the first support and the second support by a set of flexure hinges interconnected via a ring body.

In another aspect, the present disclosure relates to a joint assembly including a bellows having a first end and a second end with convolutions located there between. A gimbaled joint assembly includes a first support ring surrounding the first end of the bellows and a portion of the convolutions and a second support ring surrounding the second end of the bellows and a portion of the convolutions. A gimbal ring assembly operably couples to the first support and the second support and has a set of flexure hinges interconnected via a ring body and having a radially inward extension configured to mount to at least one of the first support ring or the second support ring.

In yet another aspect, the present disclosure relates to a joint assembly including a bellows having a first end and second end and convolutions located there between. The joint assembly further includes a gimbaled joint assembly including a first support surrounding the first end of the bellows and a portion of the convolutions, and a second support surrounding the second end of the bellows and apportion of the convolutions. The gimbaled joint assembly further includes a gimbal ring assembly operably coupled to the first support and the second support by a set of flexure hinges interconnected via a ring body.

DESCRIPTION OF EMBODIMENTS OF THE INVENTION

Figure 1:
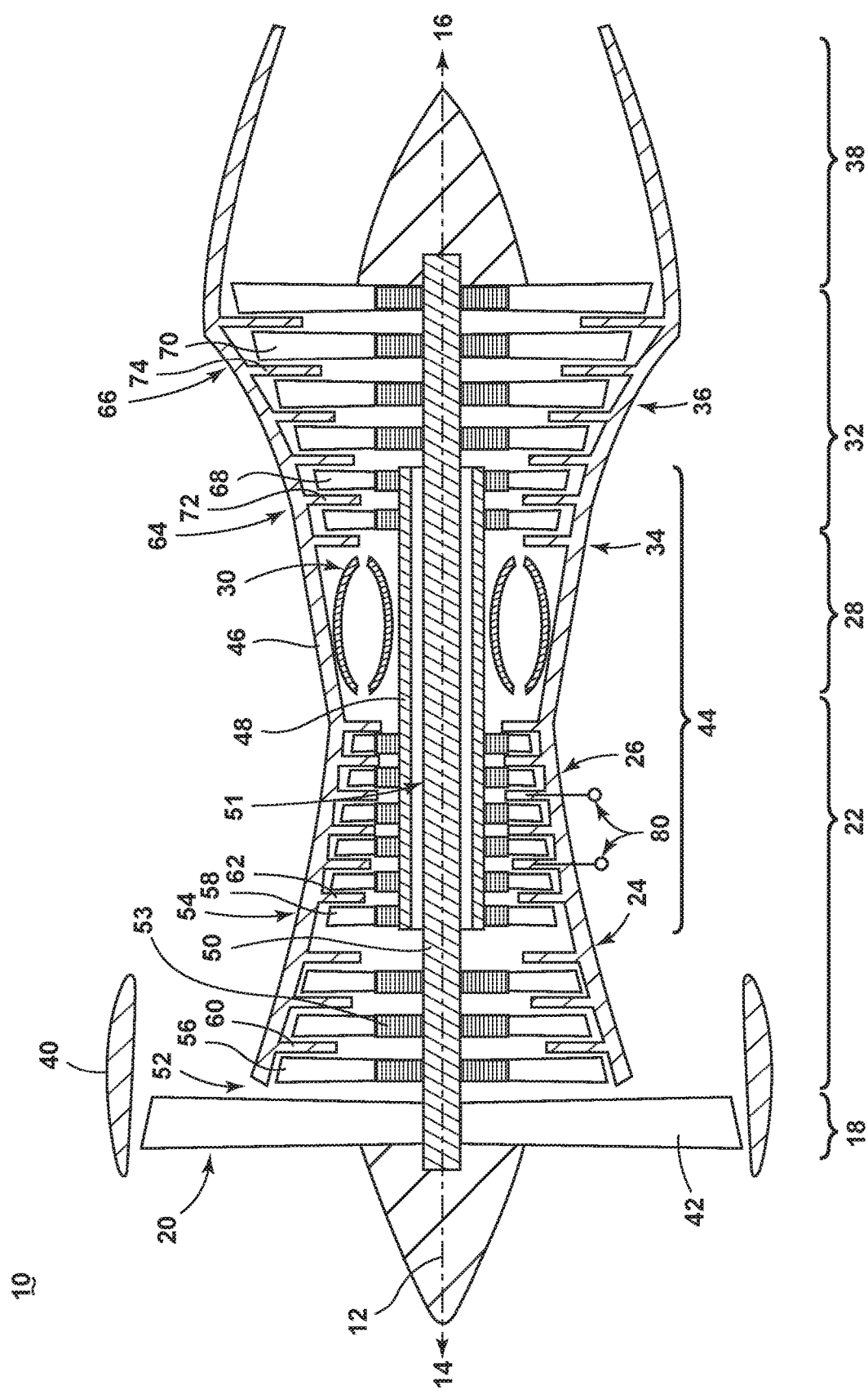
FIG. 1 is a schematic cross-sectional view of a gas turbine engine with a bleed air ducting assembly in accordance with various aspects described herein.

The aspects of present disclosure are directed to providing a flex joint. Such a flex joint can be utilized for improved rotational compliance for reduced reaction loading into the case of turbine engines during assembly, operation, and thermal growth of high temperature bleed-air ducting systems. Thus, for purposes of illustration, the present invention will be described with respect to a gas turbine engine. Gas turbine engines have been used for land and nautical locomotion and power generation, but are most commonly used for aeronautical applications such as for airplanes, including helicopters. In airplanes, gas turbine engines are used for propulsion of the aircraft. It will be understood, however, that the invention is not so limited and can have general applicability in non-aircraft applications, such as other mobile applications and non-mobile industrial, commercial, and residential applications. Additionally, the described embodiments will have equal applicability to any ducting system experiencing high system loading or large thrust and shear loads requiring a flex joint to connect elements.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine relative to the engine centerline. Additionally, as used herein, the terms "radial" or "radially" refer to a dimension extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, aft, etc.) are only used for identification purposes to aid the reader's understanding of the present invention, and do not create limitations, particularly as to the position, orientation, or use of the invention. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1 is a schematic cross-sectional diagram of a gas turbine engine 10 for an aircraft. The engine 10 has a generally longitudinally extending axis or centerline 12 extending from forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a set of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The portions of the engine 10 mounted to and rotating with either or both of the spools 48, 50 are also referred to individually or collectively as a rotor 51.

The LP compressor 24 and the HP compressor 26 respectively include a set of compressor stages 52, 54, in which a set of compressor blades 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned downstream of and adjacent to the rotating blades 56, 58. It is noted that the number of blades, vanes, and compressor stages shown in FIG. 1 were selected for illustrative purposes only, and that other numbers are possible. The blades 56, 58 for a stage of the compressor can be mounted to a disk 53, which is mounted to the corresponding one of the HP and LP spools 48, 50, respectively, with stages having their own disks. The vanes 60, 62 are mounted to the core casing 46 in a circumferential arrangement about the rotor 51.

The HP turbine 34 and the LP turbine 36 respectively include a set of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

In operation, the rotating fan 20 supplies ambient air to the LP compressor 24, which then supplies pressurized ambient air to the HP compressor 26, which further pressurizes the ambient air. The pressurized air from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

Some of the air from the compressor section 22 can be bled off via one or more bleed air duct assemblies 80, and be used for cooling of portions, especially hot portions, such as the HP turbine 34, or used to generate power or run environmental systems of the aircraft such as the cabin cooling/heating system or the deicing system. In the context of a turbine engine, the hot portions of the engine are normally downstream of the combustor 30, especially the turbine section 32, with the HP turbine 34 being the hottest portion as it is directly downstream of the combustion section 28. Air that is drawn off the compressor and used for these purposes is known as bleed air.

Figure 2:
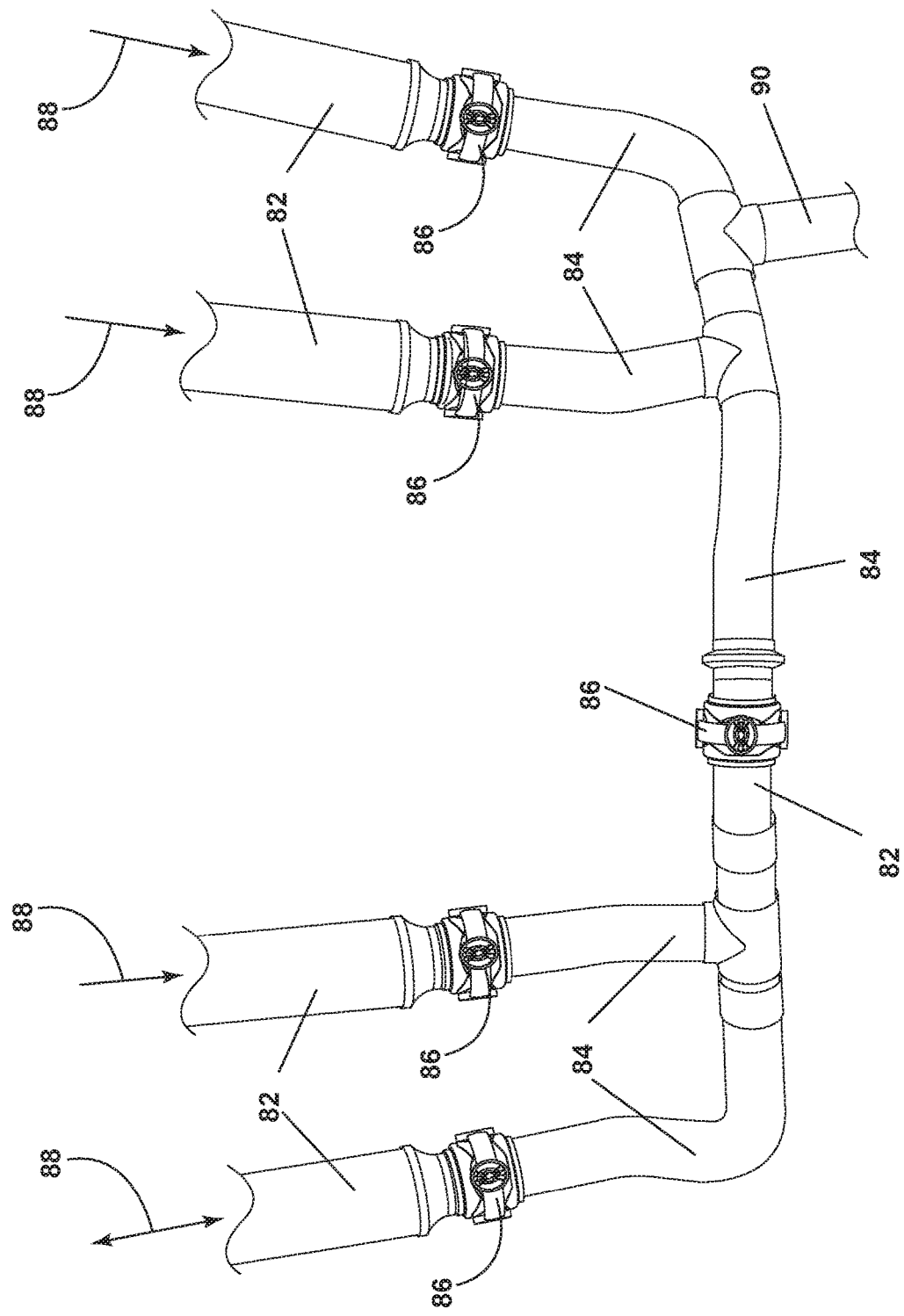
FIG. 2 is a perspective view of the bleed air ducting assembly having multiple flex joints in accordance with various aspects described herein.

Referring to FIG. 2, an exemplary bleed air duct assembly 80 includes radially inner first ducts 82 and radially outer second ducts 84. The first and second ducts 82, 84 can be fixed in their position. A joint assembly 86, which can include, but is not limited to, a ball-joint, axial joint, etc. couples the first and second ducts 82, 84. A flow of bleed air 88 can be drawn from the compressor section 22 into the first ducts 82, through the second ducts 84, and provided to an exhaust duct 90 for use in various other portions of the engine 10 or aircraft. The flow of bleed air 88 can act to heat and expand portions of the bleed air duct assembly 80. The joint assembly 86 couples the first ducts 82 to the second ducts 84 and provides for reducing or mitigating forces acting on the bleed air duct assembly 80 such as vibration or thermal expansion, while providing for operational flexion of the bleed air duct assembly 80. For example, the flex joint provides for transfer of the large thrust and shear loads at the interface between the first and second ducts 82, 84.

Figure 3:
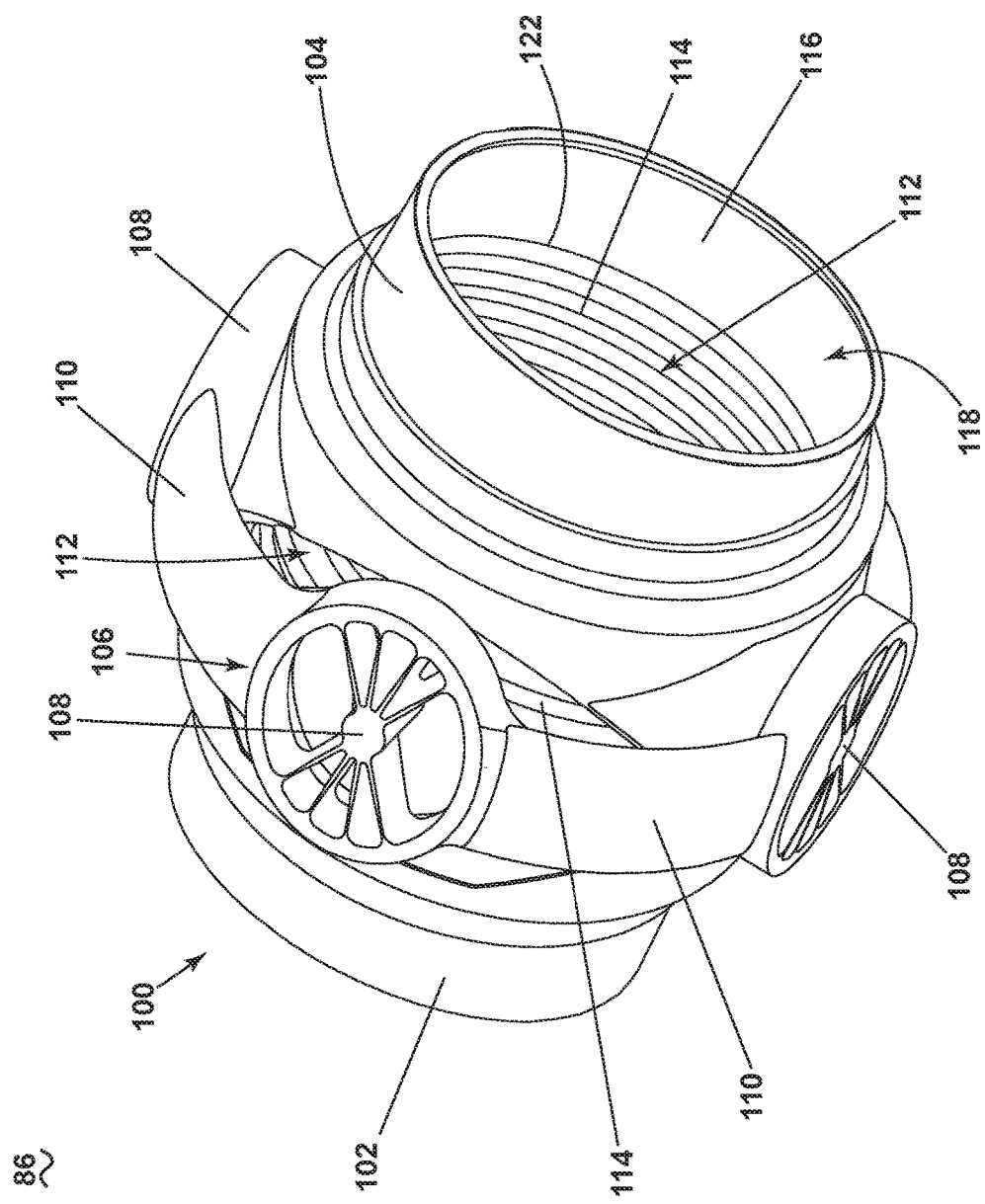
FIG. 3 is a perspective view of flex joint of FIG. 2 including four flexure hinges in accordance with various aspects described herein.

FIG. 3 illustrates an exemplary joint assembly 86. The joint assembly 86 is a gimbaled joint assembly 100 including a first support 102 and a second support 104. A bellows 112 is provided between the first and second supports 102, 104. A first end 120 (FIG. 4) of the bellows 112 is coupled to the first support 102 and a second end 122 of the bellows 112 is coupled to the second support 104. The bellows 112 includes a set of convolutions 114 configured to provide for the expansion and contraction of the bellows 112. The bellows 112 can be single-layer, dual-layer having a liner, or otherwise. The bellows 112 can be formed from a ductile material and the convolutions 114 therein permitting expansion or contraction of the bellows 112. The first and second supports 102, 104 in the illustrated example surround a portion of the convolutions 114.

The gimbaled joint assembly 100 includes a gimbal ring assembly 106. The gimbal ring assembly 106 includes a set of hinges 108, illustrated as four hinges 108, interconnected by a ring body 110. The gimbal ring assembly 106 couples the first support 102 to the second support 104 at the hinges 108. The hinges 108 can be operably coupled to the ring body 110 or can be integrally formed with the ring body 110, such as by additive manufacturing including direct metal laser melting (DMLM) for example.

One or more joint fittings or seal rings 116 can be provided at the first and second support 102, 104 for connecting the bellows 112 to the first and second support 102, 104. Additionally, the seal rings 116 can be used to seal the first and second supports 102, 104, or the bellows 112, or both, to the first and second ducts 82, 84 (FIG. 2). Alternate to the seal rings 116, it is contemplated that the joint can have an integral feature of the shroud supports 102, 104 similar to the seal rings 116 that can be resistance welded to the bellows 112. In yet another example, the seal rings 116 can be extended to become a flow liner for the bellows 112.

The combination of the first and second support 102, 104, the gimbal ring assembly 106, and the bellows 112 collectively forms a joint interior 118. The joint assembly 86 provides for fluidly interconnecting the first and second ducts 82, 84 (FIG. 2) via the joint interior 118, while bearing large thrust loads and rotational movement at the joint assembly 86.

While not shown, it is contemplated that the joint assembly 86 can be housed within an exterior housing or casing. For example, such a casing can be utilized where it may be undesirable to expose the convolutions 114 of the bellows 112 to the environment. Such a casing could mount to the first and second ducts 82, 84, or the first and second support 102, 104 by way of non-limiting examples.

Figure 4:
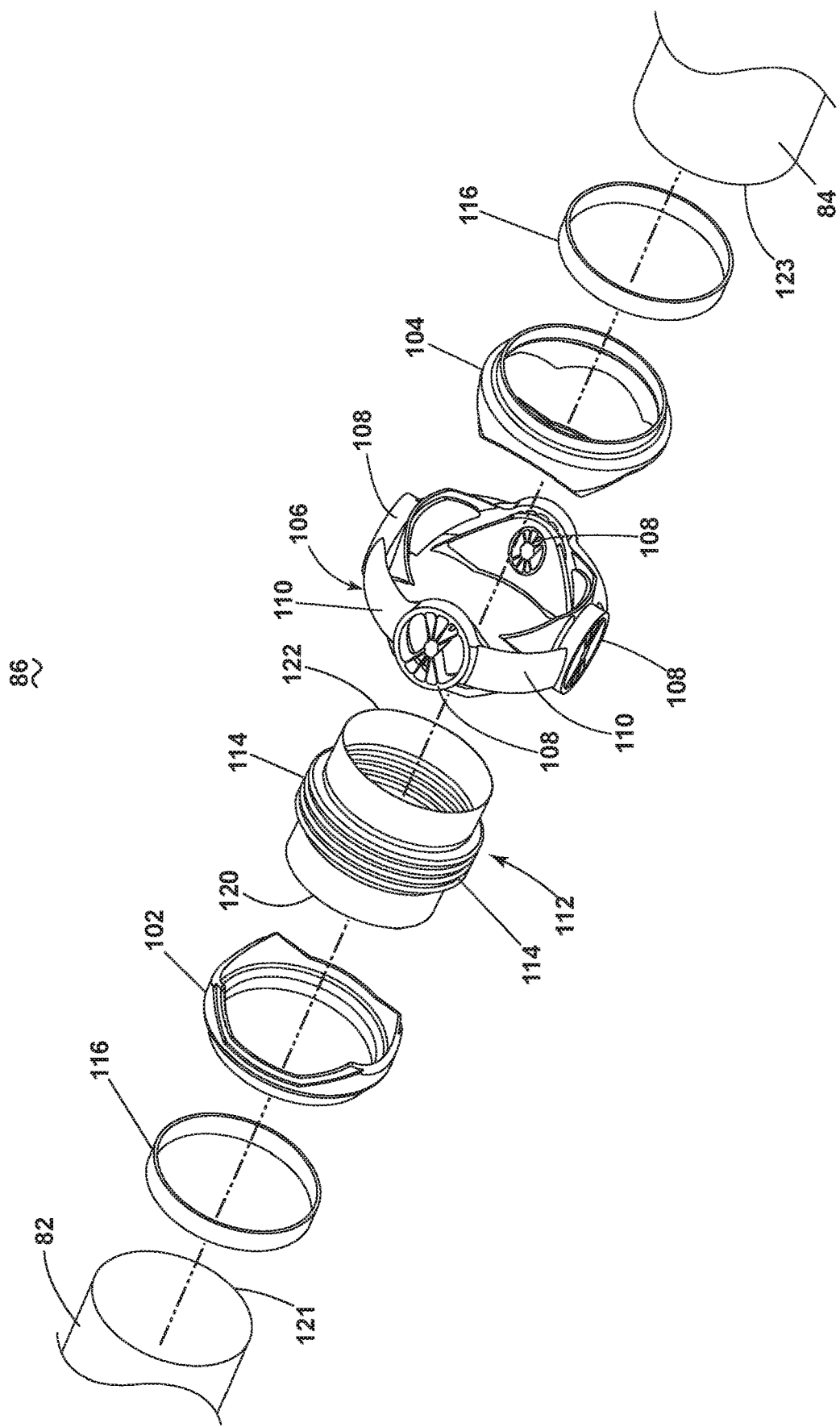
FIG. 4 is an exploded view of the flex joint of FIG. 3 in accordance with various aspects described herein.

FIG. 4 illustrates an exploded view of the joint assembly 86. When assembled, the first and second supports 102, 104 couple to the gimbal ring assembly 106. The bellows 112, including the first end 120 and the second end 122 on opposing sides of the convolutions 114, fits within the gimbal ring assembly 106 and between the first and second supports 102, 104. The seal ring 116 on each of the first and second support 102, 104 couples the bellows 112 to the first and second support 102, 104. The first end 120 of the bellows 112 can surround an outer surface of an end portion 121 of the first duct 82 and the second end 122 of the bellows 112 can surround an outer surface of an end portion 123 of the second duct 84. Such an organization can require a fillet weld to couple the bellow to the ducts 82, 84 where the bellows 112 surrounds the ducts 82, 84. In another example, where the bellows 112 confronts the ducts 82, 84, a butt weld could be used to couple the bellows to the ducts 82, 84 as well as the supports 102, 104. The first end 120 of the bellows 112 also couples to the first support 102 and the second end 122 of the bellows 112 couples to the second support 104. Upon coupling the first and second supports 102, 104 to the gimbal ring assembly 106, the bellows 112 is partially encased within the gimbaled joint assembly 100. When coupled, the first support 102 surrounds the first end 120 of the bellows 112 and at least a portion of the convolutions 114, and the second support 104 surrounds the second end 122 of the bellows 112 and at least a portion of the convolutions 114. The first support 102 and the second support 104 can cover different radial positions of the same convolution 114. It should be understood that the particular arrangement of the ducts 82, 84, the bellows 112, and the first and second supports 102, 104 couple to one another is not limited to as described. Any one element can surround another, such that a sealed fluid flow path is defined between the first and second ducts 82, 84 through the joint assembly 86.

Figure 5:
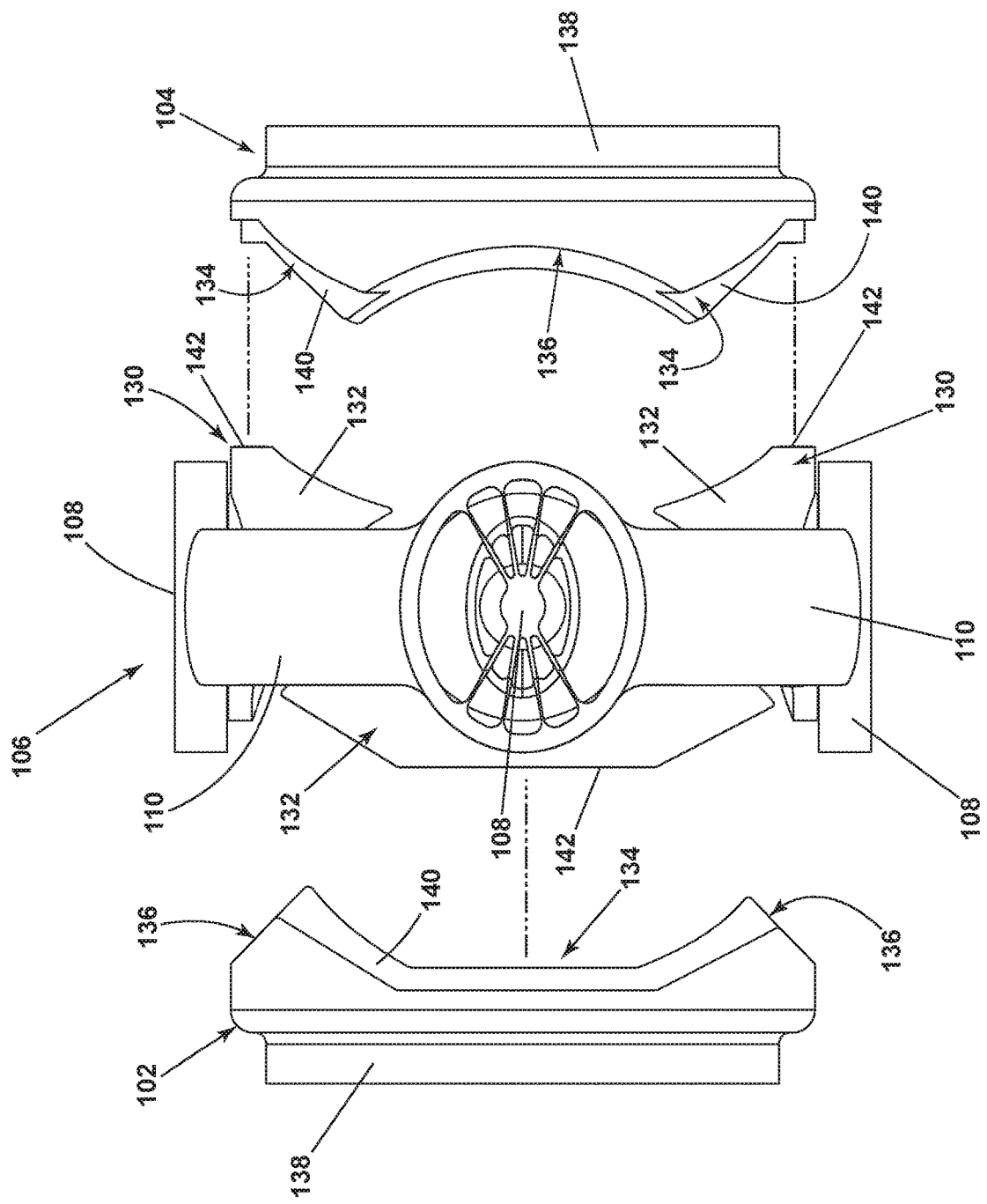
FIG. 5 is an exploded plan view of the flex joint of FIG. 4 in accordance with various aspects described herein.

FIG. 5 illustrates the interconnection between the first and second supports 102, 104 and the gimbal ring assembly 106 to form the gimbaled joint assembly 100. More specifically, it can be more clearly seen that an inner ring mount 130 including four ring mount plates 132 is included in the gimbaled ring assembly. The ring mount plates 132 are adapted to the couple to the annular first and second supports 102, 104. Only three ring mount plates 132 are visible as illustrated.

Further, the first and second supports 102, 104 each include two support mount plates 134 and two recesses 136 disposed circumferentially between the two support mount plates 134. The support mount plates 134 include a stepped portion or mount edges 140 complementary to the ring mount plates 132. The plates 134 are complementary extensions for mounting to the gimbal ring assembly 106 to the first and second support 102, 104. The support mount plates 134 are positioned on opposing radial sides of the supports 102, 104.

While the ring mount plates 132 and the support mount plates 134 are illustrated as complementary extensions for coupling the supports 102, 104 to the gimbal ring assembly 106, the extension can alternatively be interwoven. The extension, or ring mount plates 132, or the support mount 134 can also be any yokes or devises that are adapted to couple the supports 102, 104 to the gimbal ring assembly 106.

Ends 138 of the supports 102, 104 are sized to couple to adjacent ducts 82, 84. The ends 138 have a diameter less than that of the remaining portion of the supports 102, 104 including the mount plates 134 and the recesses 136. In order to properly install a bellows within the joint assembly, the bellows needs to be inserted within the gimbal ring assembly prior to mounting the supports 102, 104 to the gimbal ring assembly 106. Alternatively, it is contemplated that one of the supports 102, 104 is integrated with the gimbal ring assembly 106, permitting installation or removal of the bellows through only one of the removable supports 12, 104.

The first and second supports 102, 104 can be arranged such that the support mount plates 134 align with the ring mount plates 132 of the gimbal ring assembly 106. The mount edges 140 are sized and shaped to receive the ring mount plates 132 to couple the gimbal ring assembly 106 to the supports 102, 104 on opposing sides of the ring body 110. Attachment of the mount edges 140 to the ring plates 132 can be secured by welding, such as laser welding in one non-limiting example, creating a continuous weld. Ring mount plates 132 can be evenly spaced about the gimbal ring assembly 106, alternating facing the first and second support

102, 104. As such, the first and second supports 102, 104 can be identical, but rotated 90-degrees relative to one another. In this position, the plates 134 of one of the first and second supports 102, 104 axially align with the recesses 136 on the other of the first and second supports 102, 104.

Figure 6:
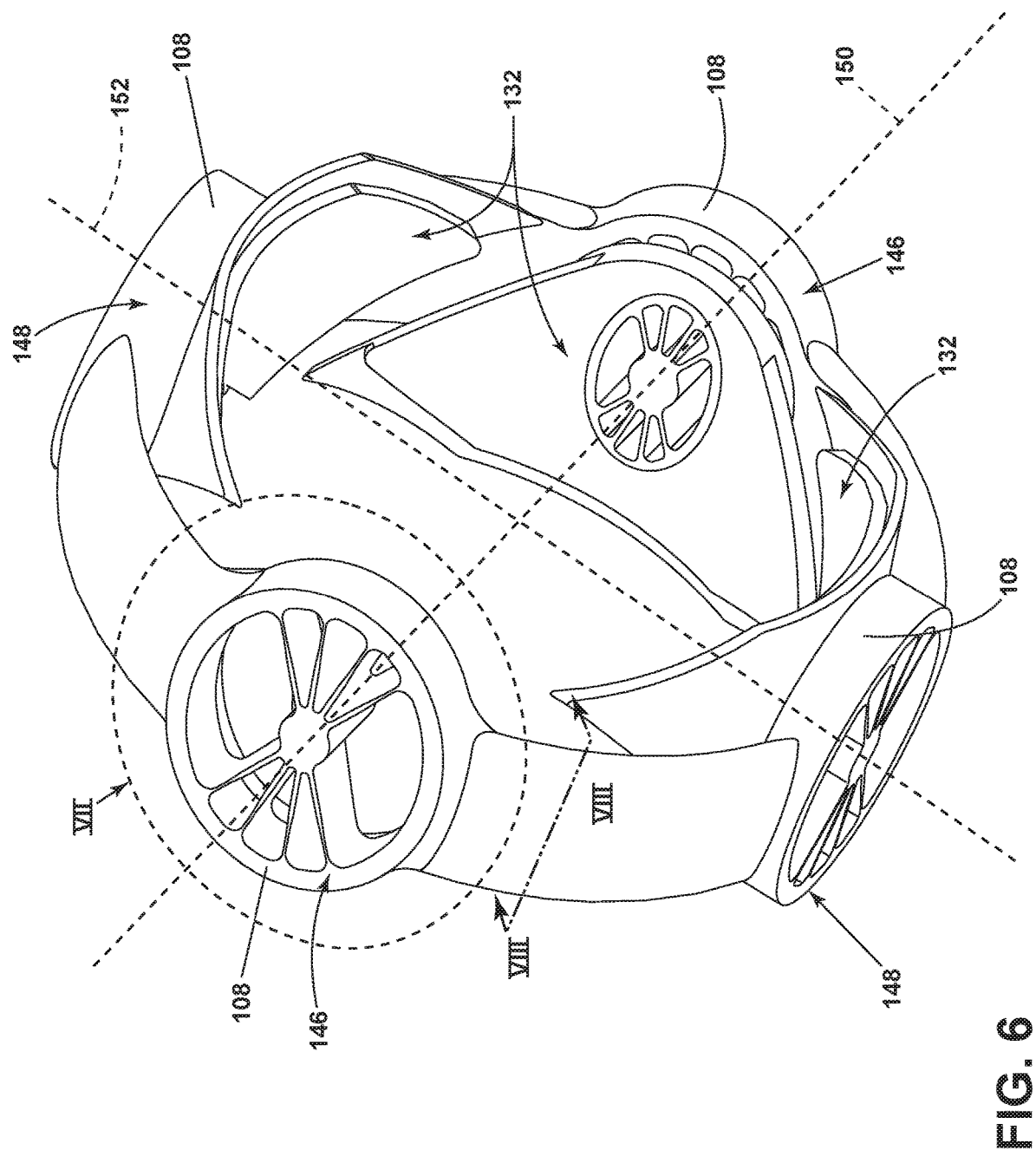
FIG. 6 is an enlarged view a flexure ring including the four flexure hinges in accordance with various aspects described herein.

FIG. 6 illustrates the hinges 108 organized as four, evenly spaced hinges 108 about the gimbal ring body 110. Alternating hinges 108, disposed on opposite sides of the gimbal ring assembly 106, adjacent to similar-facing ring mount plates 132, can be defined as a first pair of hinges 146 and a second pairs of hinges 148 as the alternatively spaced hinges 108 about the ring body 110. The first and second pairs of hinges 146, 148 can define a first rotational axis 150 and a second rotational axis 152, respectively. The pairs of hinges 146, 148 permit rotation about the first and second rotational axes 150, 152. The pairs of hinges 146, 148 correspond to two similar-facing ring plate mounts 132. As such, the pair of hinges 146, 148 can correspond to the first and second supports 102, 104 (FIG. 5). The first pair of hinges 146 can couple the first support 102 to the gimbal ring assembly 106 and the second pair of hinges 148 can couple the second support 104 to the gimbal ring assembly 106. Thus, the gimbal ring assembly 106 can rotate or pivot about each rotational axis 150, 152 defined by the pairs of hinges 146, 148, relative to the attached first and second supports 102, 104 (FIG. 5). Along the two rotational axes 150, 152, the gimbal ring assembly 106 permits flexion of the joint assembly 86 about two degrees of freedom.

While the hinges 108 are illustrated as four, evenly spaced hinges 108, it should be appreciated that the gimbal ring 106 is not so limited. It is contemplated that any number of hinges can be used. Additionally, the hinges 108 need not be evenly spaced, such that rotational axes need not be orthogonal to one another. Such orientations can be tailored to a particular anticipated bending moment of the particular joint assembly.

Figure 7:
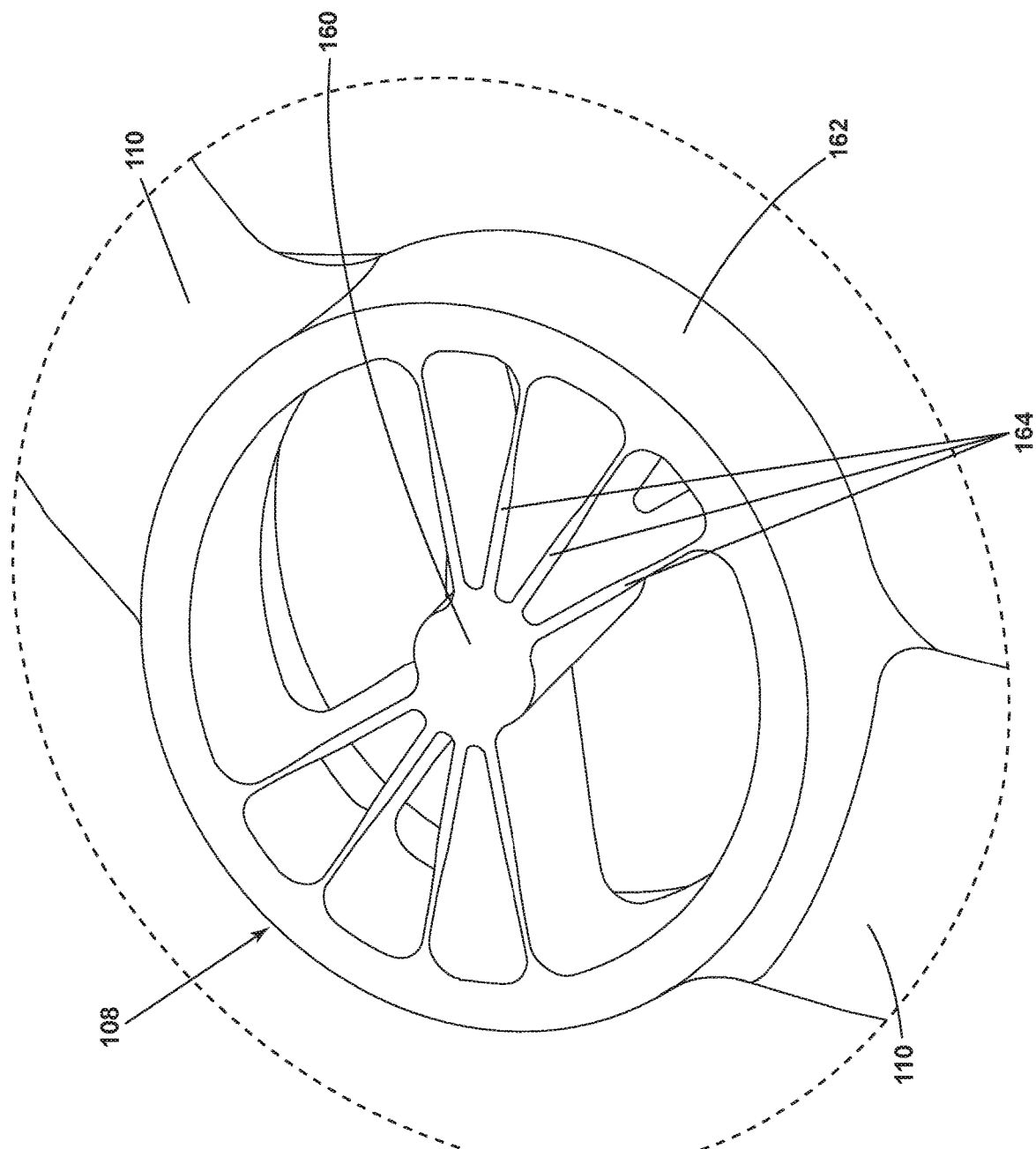
FIG. 7 is an isolated view of the flexure hinge of FIGS. 3 and 6 including a ring and spoke configuration, in accordance with various aspects described herein.

FIG. 7 illustrates an isolated, enlarged view of one hinge 108. The hinge 108 includes a radially inward extension 160 operating as a rotational axis, which can be the first or second rotational axis 150, 152 of FIG. 6. The hinge 108 further includes a ring 162 and a set of spokes 164 that define a ring and spokes configuration for the hinge 108. The spokes 164 couple the ring 162 to the radially inward extension 160. The ring 162 can be oval or elliptical shaped although it will be understood that other shapes are contemplated. Such additional shapes can include a circle, square, rectangle, or octagonal shape in non-limiting examples. The spokes 164 are illustrated as eight spokes 164 grouped into two sets of four spokes 164. It should be understood that the groups of spokes 164 are exemplary, and the spokes 164 can include any number of spokes 164, in any organization coupling the ring 162 to the radially inward extension 160. Alternatively, no radially inward extension may be included and the spokes can extend from one portion of the ring 162 to another.

The spokes 164, the ring 162, or the radially inward extension 160 can be made of a flexible material. For example, such materials can include materials typical to additive manufacturing or direct metal laser melting materials, such as nickel alloy powders, titanium alloys, or similar. The spokes 164 permit flexion of the hinge 108 such that the ring body 110 can rotate about the axis 150, 152 extending through the radially inward extension 160. While shown as increasing in width toward the radially inward extension 160, the spokes 164 can have constant or variable cross-sections, to adapt the flexion of the spokes 164 nearer or farther from the ring 162 or the radially inward extension 160. Additionally, the material, number, density, cross-sectional area, thickness, or other parameters of the spokes 164 can be adapted to particularly tune the flexion of the hinge 108 based upon anticipated loading at the gimbaled joint assembly 100. As such, the first and second support 102, 104 mounted to the hinges 108 can rotate relative to the gimbal ring assembly 106 to properly flex under anticipated loading forces, such as axial loading or shear forces. The internal system pressure load will provide for the axial thrust load and for thermal growth due to heating and vibrational movement of the joint, causing the joint to bend about the hinges 108 of the gimbal ring assembly 106.

Figure 8:
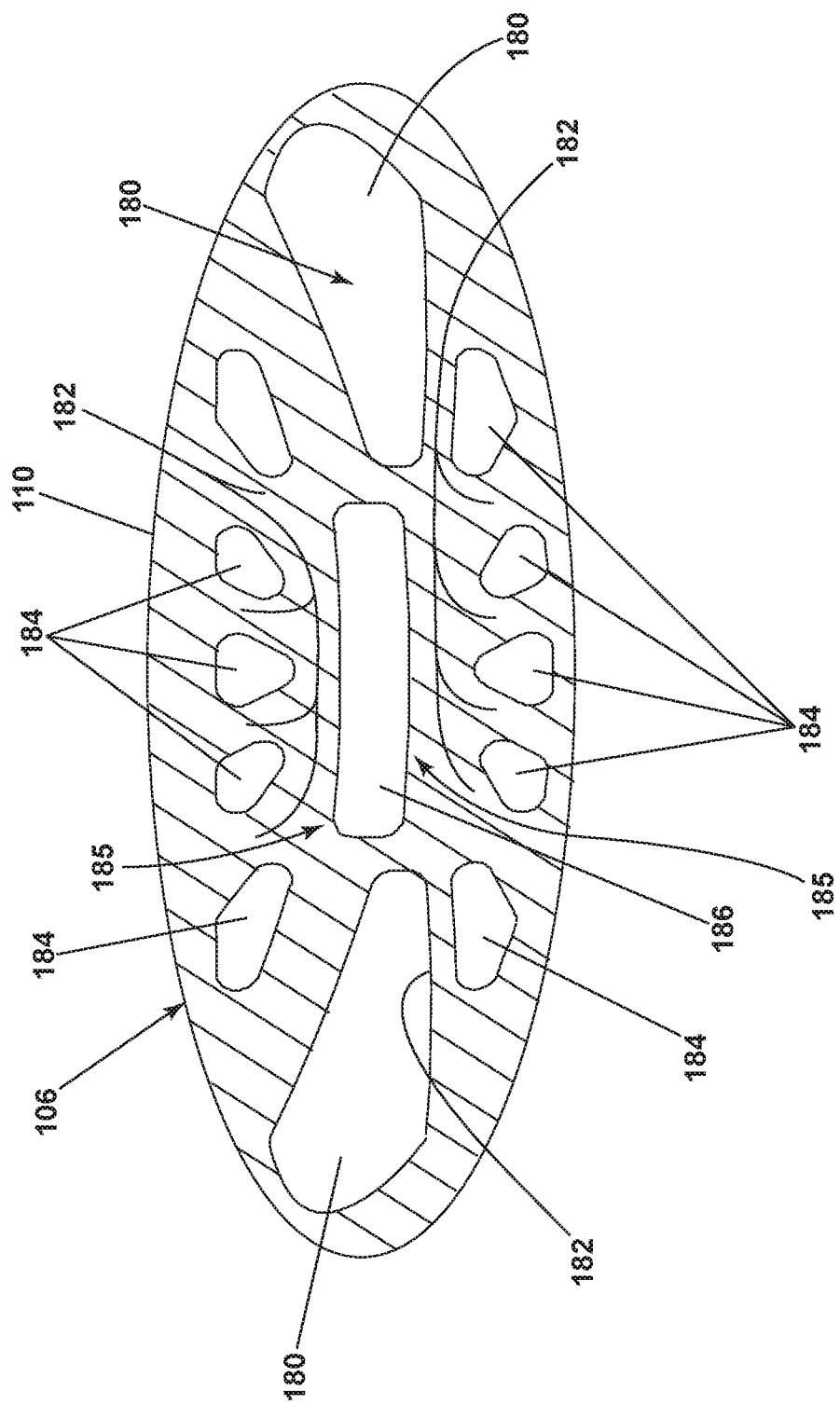
FIG. 8 is a sectional view of the flexure ring of FIG. 6 illustrating internal ribs and cavities in accordance with various aspects described herein.

FIG. 8 illustrates a sectional view of the ring body 110 of FIG. 6. The ring body 110 includes an interior 180 having a plurality of internal ribs 182 separating the interior 180 into a plurality of chambers 184. A central band 185 is formed at the intersection of the internal ribs 182 to form a central cavity 186 extending circumferentially through the ring body 110. The ribs 182 can be of different size, shape, or cross-sectional area in order to define variable shapes and cross-sections for the chambers 184. The system of ribs 182, chamber 184, and cavities 186 provides for reduced system weight, while optimizing the ring body 110 to the torsional and bending stresses associated with the joint assembly 86. Such cavities extend to the four hinges 108 having the internal spoke flexures 164. These cavities can also create additional openings to remove excess metal powder from the additive building process.

It should be appreciated that the interior of the ring body 110 can include any variable cross-section geometry, having any number, spacing, sizing, or otherwise of ribs 182 and cavities or chambers 184. Additionally, the interior can include other internal structures, such as gussets, and can include variable thicknesses of the walls, ribs 182, or gussets. It should be further appreciated that the particular internal variable, cross-sectional geometry of the ring body 110 can be optimized to reduce weight while maintaining appropriate structural integrity under anticipated loading and operational conditions of the particular implementation of the joint assembly 86.

Figure 9:
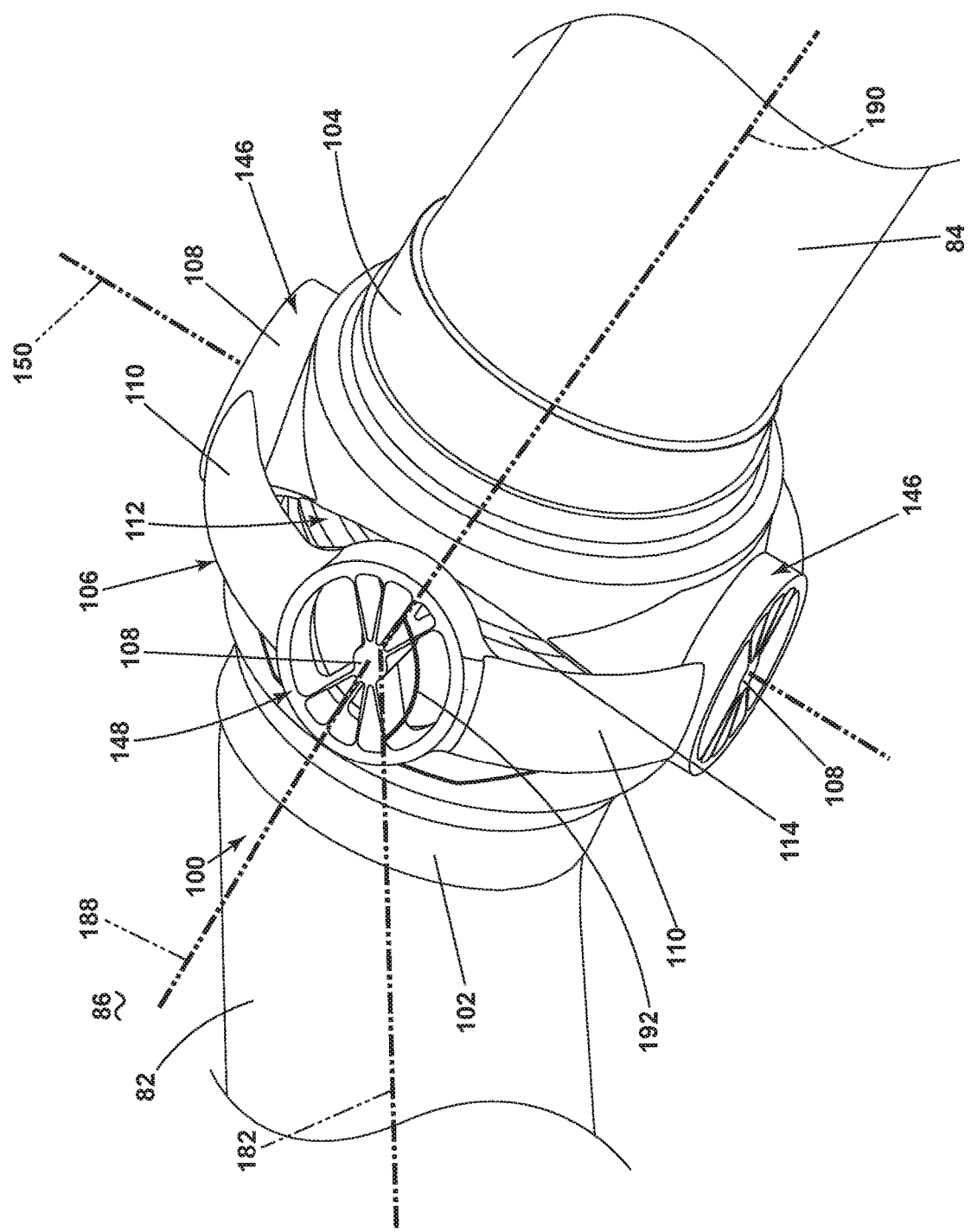
FIG. 9 is a perspective view of the flex joint of FIG. 3 in a flexed position in accordance with various aspects described herein.

FIG. 9 illustrates the joint assembly 86 of FIG. 3 coupled to the first and second ducts 82, 84. The first duct 82 can define a first duct axis 188 along the longitudinal length of the first duct 82 and the second duct 84 can define a second duct axis 190 along the longitudinal length of the second duct 84. The four hinges 108 of the gimbal ring assembly 106 define the first and second rotational axes 150, 152 rotatable about the first and second pairs of hinges 146, 148, respectively. As illustrated, the joint assembly 86 is flexed about the first and second axes 150, 152 at the pairs of hinges 146, 148. A duct angle 192 can be defined between the first and second duct axes 190, 192. The duct angle 192 can be defined in three-dimensional space, as the first and second rotational axes 150, 152 provide for two rotational degrees of freedom. The duct angle 192 can be about three or four degrees during normal operating conditions, while as much as ten degrees or more is contemplated as a one-time initial installation condition. Depending on the orientation of the gimbal joint during this installation, the maximum total bending from the free-state can be between 8-10 degrees. The relative bending of each of the two gimbal joints will be a combination to accommodate the installation condition. In the non-flexed position, the duct angle 192 can be 180-degrees.

It should be appreciated that the joint assembly 86 as described in relation to FIGS. 3-9 provides for adjoining a first duct to a second duct in conditions experiencing large thrust and shear loads at the interface of the first and second ducts, due to system level thermal growth and vibration. The joint assembly 86 utilizing the gimbaled joint assembly 100 with the gimbal ring assembly 106 and the hinges 108 provides for removal of the typical frictional interface wear surfaces and pressure load-dependency on rotational bending moment, while supporting the loading at the joint. The joint assembly 86 is a zero-backlash tunable, variable-section, counter-balancing system to create a wear-free kinematic revolute interface joint. The system of four hinges 108 spaced about the gimbal ring assembly 106 provides for creating two degrees of rotational freedom at the joint assembly 86. The two, orthogonal degrees of freedom provides angular articulation of the load along the curved ring body 110, supporting two simultaneous compound bending moments.

The joint assembly 86 or particular elements thereof can be made by additive manufacturing, such as 3D printing or direct metal laser melting (DMLM), while other manufacture methods such as casting or molding are contemplated.

Figure 10:
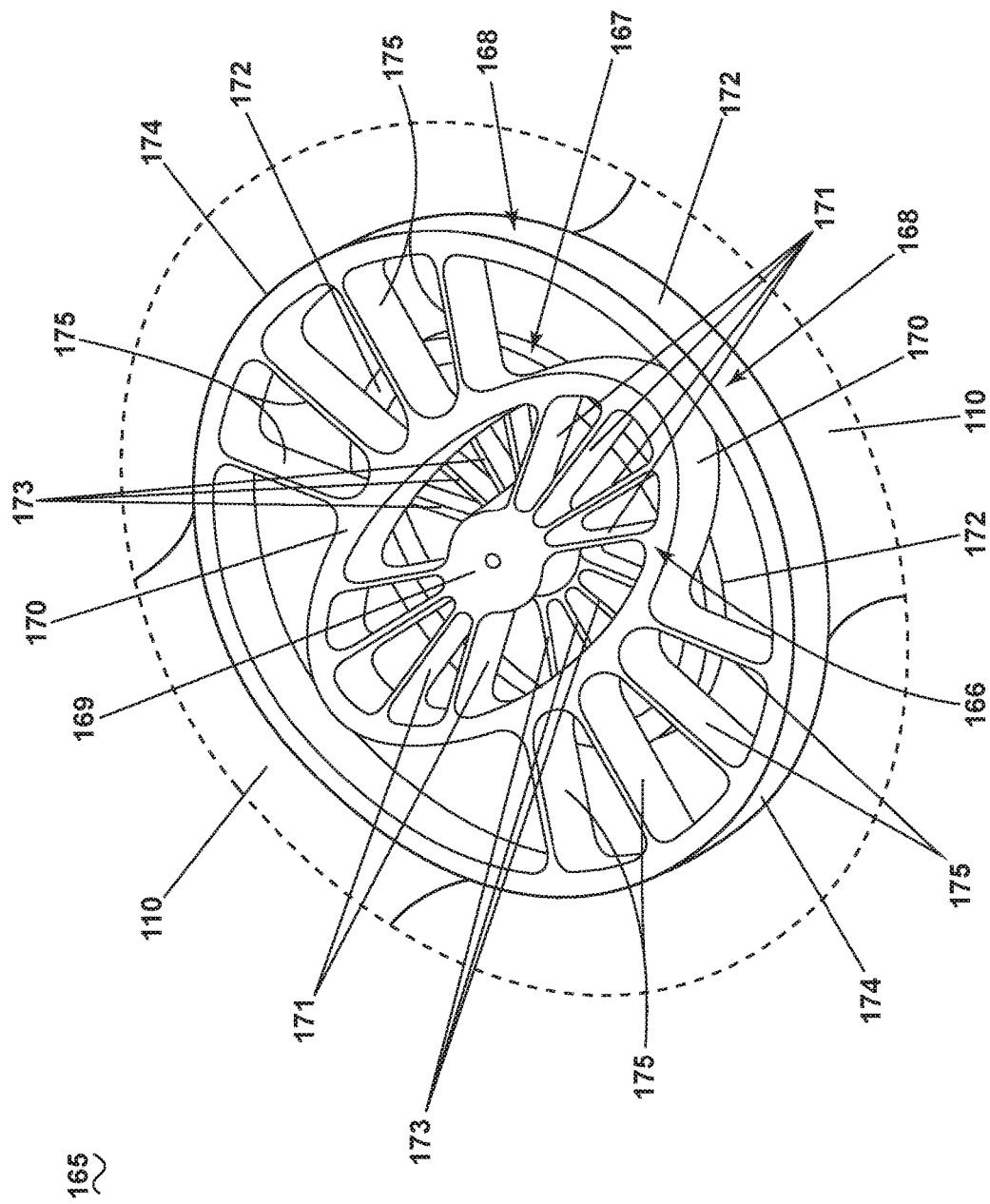
FIG. 10 is an isolated view of an alternative flexure hinge having additional ring and spoke configurations, in accordance with various aspects described herein.

FIG. 10 illustrates an alternate hinge 165, which can be the hinge 108 of the gimbaled joint assembly 100 as described herein. It should be understood that the hinge of FIG. 10 can be beneficial to minimize peak localized stresses and maximize the total rotational angle, as opposed to the hinges 108 described above. The alternate hinge 165 includes three ring and spoke configurations, as a first ring and spoke configuration 166, a second ring and spoke configuration 167, and a third ring and spoke configuration 168 organized around a central radially inward extension 169. The third ring and spoke configuration 168 surrounds the first ring and spoke configuration 166, while the second ring and spoke configuration 167 is radially stacked with the first ring and spoke configuration 166.

The first ring and spoke configuration 166 includes a first ring 170 and a first set of spokes 171. The first set of spokes 171 couple the first ring 170 to the radially inward extension 169. The third ring and spoke configuration 168 includes a third ring 174 and a third set of spokes 175. The third set of spokes 175 couple the third ring 174 to the first ring 170 of the first ring and spoke configuration 166. Thus, the third ring and spoke configuration 168 can be tailored to flex or rotate based upon different requirements than that of the first ring and spoke configuration 168.

As shown, the first and second ring and spoke configurations 166, 167 can be adapted to flex or rotate at a loading force in order to rotate degree combined angle that is a portion of the total desired angle for the particular rotational hinge, about the first or second rotational axes 150, 152 (FIG. 6) extending through the radially inward extension 169. The third ring and spoke configuration 168 can be adapted to flex at an additional angle to share and distribute the load to the multiple spoke flexures or against a greater or lesser loading force. As such, not only can each hinge be particularly tailored to better distribute stresses for anticipated loading forces, but can be tailored to particularly flex based upon the magnitude of the thrust versus the rotational loading forces.

The second ring and spoke configuration 167 includes a second ring 172 and a second set of spokes 173. The second set of spokes 173 couple the second ring 172 to the radially inward extension 169, but radially within the first ring and spoke configuration 166 relative to the annular gimbal ring assembly 106 (FIG. 3). In this organization, the second ring and spoke configuration 167 is radially stacked below the first ring and spoke configuration 166, relative to the annular gimbal ring assembly 106 (FIG. 6) In the staked organization, the first and second ring and spoke configuration 166, 167 can rotate relative to one another about the radially inward extension 169. Thus, in one example, the ring body 110 coupled to the first ring and spoke configuration 166 can rotate relative to the first or second support 102, 104 coupled to the second ring and spoke configuration 167 via the ring mount plates 132 (FIG. 6). This configuration enables rotation of the supports 102, 104 relative to the gimbal ring assembly 106, about the rotational axes 150, 152 FIG. 6). It should be appreciated that the total number of rotational flexures and flexure rings including the flexures increases the overall compliance of the total stacked rotational kinematic assembly. The additional flexure rings and flexures distribute the total rotational motion to the multiple flexures to reduce peak stresses locally. The magnitude of rotation for a give flexural beam is then reduced by the distribution to the additional flexure rings and flexures therein. It should be further appreciated that with the radially stacked organization, the hinge 165 can be adapted to flex under a first loading force at the ring mount plates 132 via the second ring and spokes configuration 167, and adapted to flex under a second loading force at the ring body 110 via the first ring and spokes configuration 166.

While the rings 170, 172, 174 are illustrated as having a substantially elliptical or oval shape, it should be appreciated that the rings 170, 172, 174 can have any shape, such as a square, rectangular, or circular shape in non-limiting examples. Additionally, the number, pattern, grouping, organization, size, shape, or any other parameter of the spokes 171, 173, 175 should not be limited as shown in FIG. 8. The spokes 171, 173, 175 can be made of high-temperature additive powder Nickel or Titanium alloy materials, in non-limiting examples. Additionally, the spokes 171, 173, 175 can be tunable, based upon material, thickness, number, or organization, in non-limiting examples, to tune the bending moment of the hinge 165 to a desired bending moment for a specific pressure load requirement.

It should be appreciated that the hinge 165 can include a wide variety of organizations, having multiple ring and spoke configuration or particular tailoring of the rings or spokes to adapt the gimbaled joint assembly 100 to anticipated loading or differing anticipated loading. For example, using an aircraft gas turbine engine, loading at the gimbaled joint assembly 100 during idle engine operations can be different from loading during cruise engine operations. The hinge 165 can be particularly tailored to both loading conditions.

The spokes 171, 173, 175 and the hinges 108 and the internal structure of the ring body 110 can be adapted and optimized for minimal strain energy and mass, to reduce weight. Furthermore, the spokes 171, 173, 175 and hinges 108 can be tuned for load carrying capabilities and minimal rotational moment.

Figure 11:
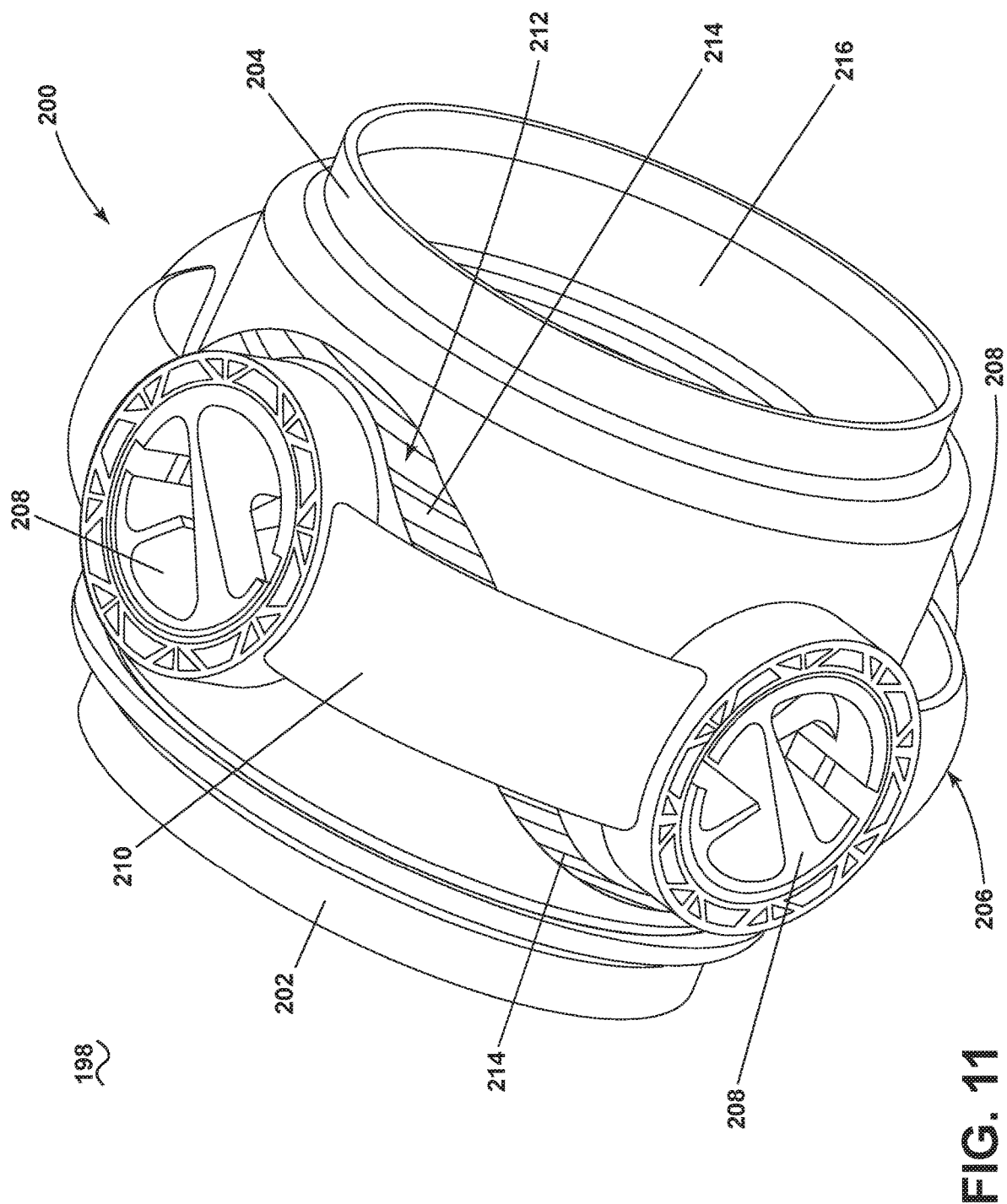
FIG. 11 is a perspective view of a second flex joint with a revolute hinge in accordance with various aspects described herein.

Referring now to FIG. 11, another exemplary joint assembly 198 is illustrated. The joint assembly 198 can be similar to the joint assembly 86 of FIGS. 3-10, including gimbal joint assembly 200 with a first support 202 and a second support 204. The gimbal joint assembly 200 can further include a gimbal ring assembly 206 with a set of hinges 208 mounted about a circumferential ring body 210. The gimbal ring assembly 206 couples to the first and second supports 202, 204 at the hinges 208. A bellows 212 having a set of convolutions 214 can couple to the first and second supports 202, 204. The convolutions 114 can be at least partially surrounded by the first and second supports 202, 204. Seal rings 216 can be used to seal and mount the bellows 212 to the first and second supports 202, 204.

Figure 12:
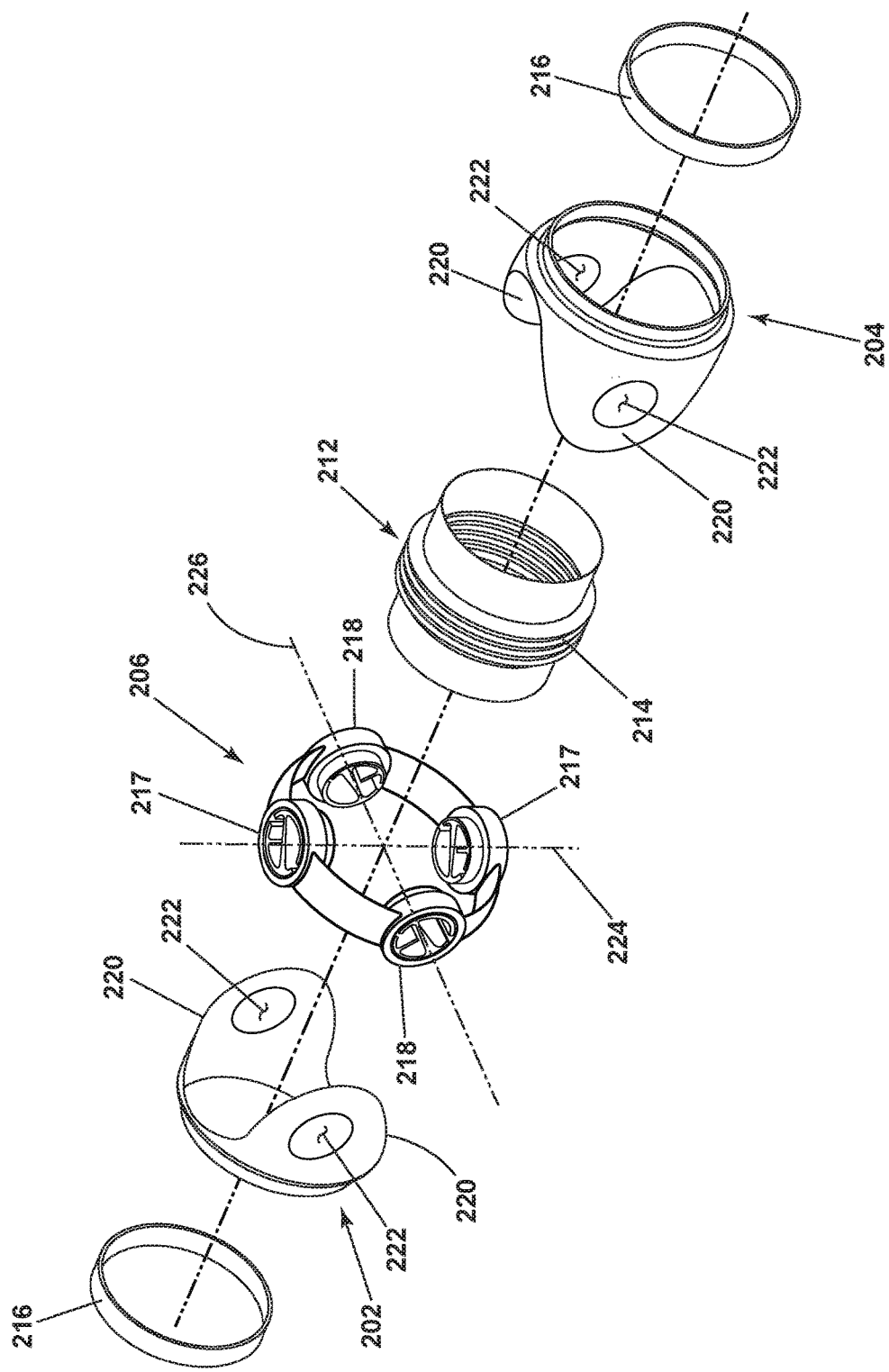
FIG. 12 is an exploded view of the flex joint of FIG. 10 in accordance with various aspects described herein.

FIG. 12 illustrates an exploded view of the joint assembly 198. The first support 202 and the second support 204 each include a pair of radially spaced mount faces 220, with each face 220 including a mount aperture 222. The mount apertures 222 are adapted to receive radially opposing hinges 208 on the gimbal ring assembly 206. The radially opposite hinges 208 can define first and second pairs of hinges 217, 218, with the first pair of hinges 217 defining a first axis of rotation 224 and the second pair of hinges 218 defining a second axis of rotation 226. The mount apertures 222 on the mount faces 220 are adapted to couple the gimbal ring assembly 206 to each of the supports 202, 204 at the pairs of hinges 217, 218. When coupled, each support 202, 204 can rotate or pivot about one of the first or second axes of rotation 224, 226.

Figure 13:
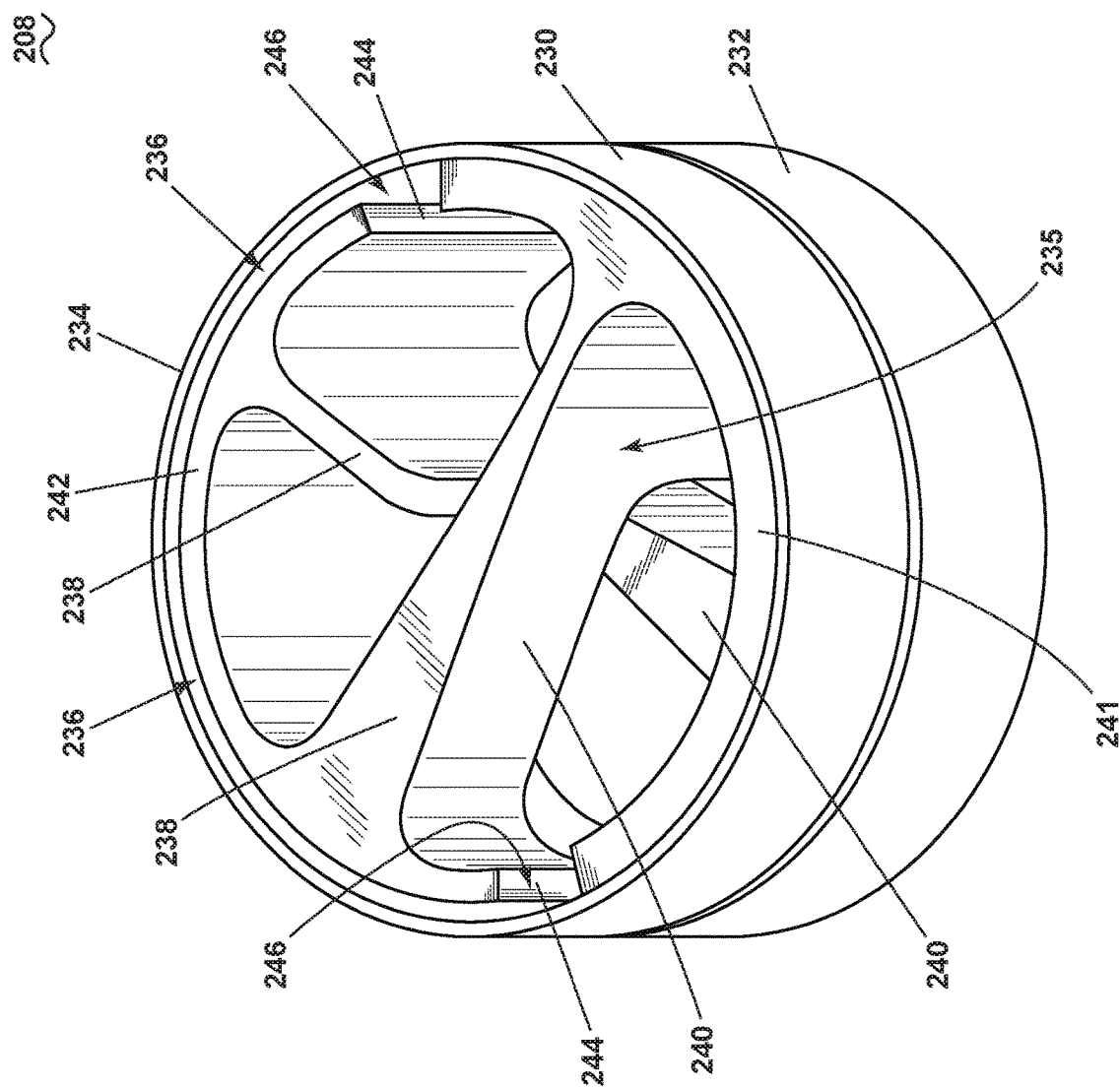
FIG. 13 is a perspective view of the revolute hinge of the flex joint of FIG. 10 in accordance with various aspects described herein.

FIG. 13 illustrates an enlarged, perspective view of the hinge 208. The hinge 208 includes an upper ring portion 230 and a lower ring portion 232. The upper portion ring 230 can mount to the ring body 210 (FIG. 11), while the lower ring portion 232 can mount to the mount faces 220 of the supports 202, 204 at the mount apertures 222. This double flexure insert is symmetric from top to bottom, with equivalent flexure geometries. The upper ring portion 230 and the lower ring portion 232 can flexibly rotate relative to one another, such as about the axes of rotation 224, 226 (FIG. 12) defined through the center of the hinge 208.

The hinge 208 can further include a cylindrical exterior 234 that is included in both the upper and lower portions 230, 232. The insert An interior portion 235 can be provided within and couple to the cylindrical exterior 234. The interior portion 235 can include a mounted portion 241, a floating portion 242, and two variable flexure bridges 238. The bridges can have variable thicknesses that are tuned relative to rotational motion between the top 230 and the bottom 232. The can be tuned to reduce the local flexure stresses and the total flex joint bending moment. The use of two bridges 238 provides for a double-flexure rotation mechanism, with two equal flexures to create the compliant rotational motion. The mounted portion 241 couples to the inside of the cylindrical exterior 234. The bridges 238 couple the mounted portion 241 to the floating portion 242. The floating portion is spaced from the cylindrical exterior 234 to define an arcuate channel 236 between the floating portion 242 and the cylindrical exterior 234. The bridges 238 can each having a short portion 240 to cross one another as the bridges 238 extend from the floating portion 242 to the interior portion 235. The floating portion 242 further includes opposing terminal ends 244 spaced from the mounted portion 241 by a gap 246 on either side of the interior portion 235.

The entirety of the hinge 208 can be formed as a single unit, such as with additive manufacturing form high-temperature metal alloys. Additionally, the hinge 208 can be printed as integral to a gimbal ring, such as the ring and mounting plate 132 of FIG. 5. Alternatively, the hinge 208 can be formed by coupling the individual elements, such as separately coupling the interior portion 235, the cylindrical exterior 234, or the bridges 238.

The two interior bridges 238 are shown as symmetric. However, it should be appreciated that the geometry of the independent flexures can be asymmetric. Both flexures can have an individual variable thickness and width. Such features are tunable based upon anticipated loading and stress concentrations.

Figure 14:
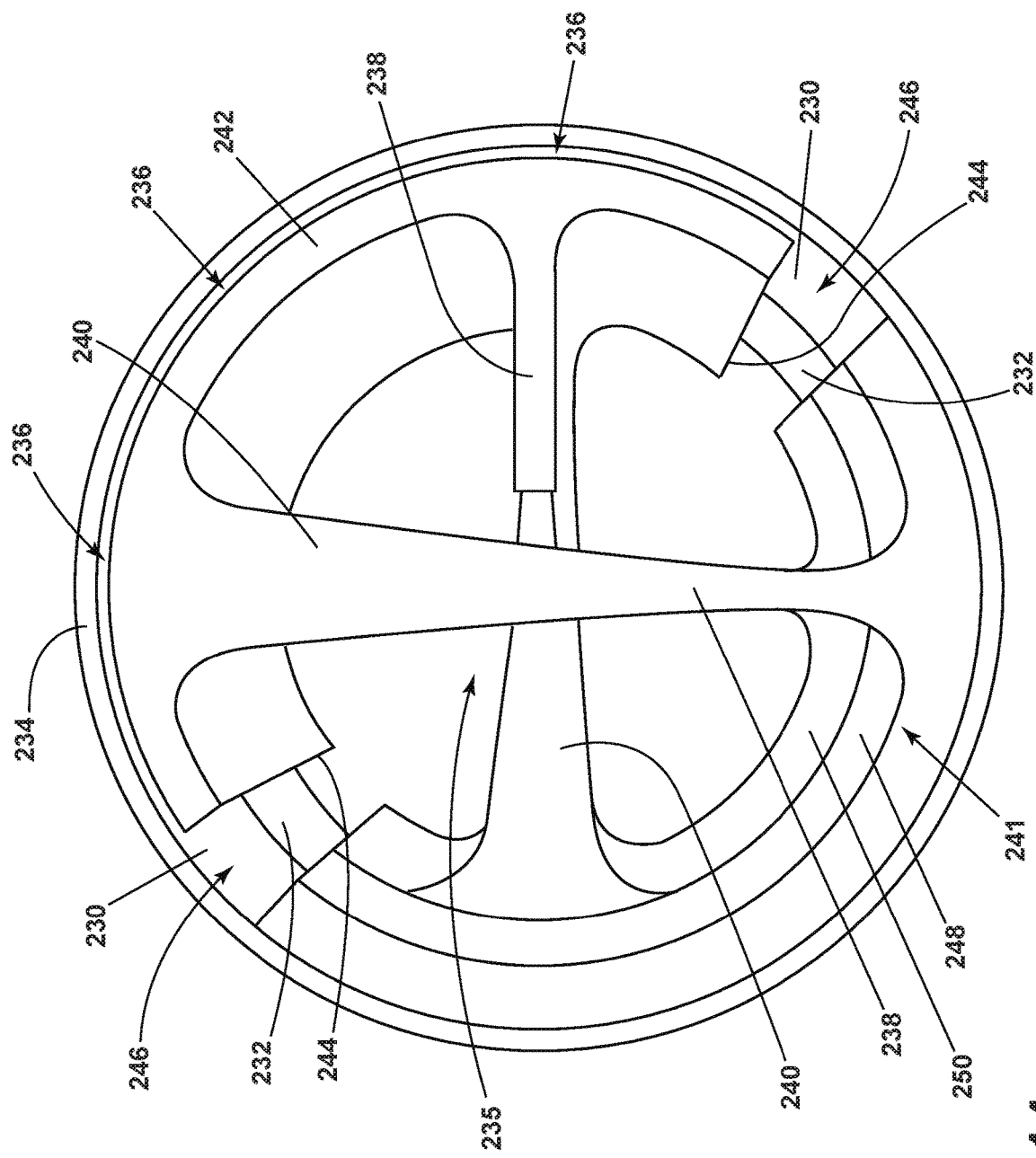
FIG. 14 is a plan view of the revolute hinge of FIG. 12 illustrating flex gaps in accordance with various aspects described herein.

FIG. 14 illustrates a plan view showing the gaps 246 defined the sides of the floating portion 242. The gaps 246 provide space for rotation of the floating portion 242 of the interior 235 portion within the cylindrical exterior 234. The mounted portion 241 is separated into an upper mounted portion 248 and a lower mounted portion 250. One bridge 238 can couple the floating portion 242 to the upper mounted portion 248 and the other bridge 238 can couple to the lower mounted portion 250. In this organization, flexion of the floating portion 242 or the bridges 238 permits rotation of the upper and lower ring portions 230, 232 relative to one another at the upper and lower mounted portions 248, 250 of the mounted portion 241. It should be appreciated that the mounted portion 241 comprises the two individual upper and lower mounted portions 248, 250 that are adjacent to, but separated from one another to permit rotation of the upper and lower portions 230. 232. The bridges 238 can be made of material capable of flexion, such as materials useful in additive manufacturing, such as Nickel or Titanium powders, or the like, in order to rotate the floating portion 242 relative to the exterior 234 to increase or decrease the gaps 246. Such flexion of the bridges 238 permits rotation of the upper portion 230 relative to the lower portion 232. Thus, the joint assembly 198 can rotation about two degrees of freedom defined by the first and second axes of rotation 224, 226, at the radially opposing hinges 208. In one example, the gaps 246 are spaced to permit flexion of the upper portion 230 relative to the lower portion 232 by about three or four degrees in either rotational direction, while flexion as much as ten degrees in either direction for initial installation is contemplated.

It should be appreciated that the particular bridge 238 can be tailored to the particular anticipated loading. For example, due to the additive fabrication method, the cross-sectional area or three-dimensional shape can be adapted based upon the anticipated loading. Additionally, the size, density, or other factors can be adapted to flex or bend based upon an anticipated bending moment. Three-dimensional flexured sections with slotted cutouts can be added at the center of the bridges to increase bending compliance while maintaining overall torsional stiffness.

Additive manufacturing, such as Direct Metal Laser Melting (DMLM) or Direct Metal Laser Sintering (DMLS), can make any of the elements described herein. For example, the complex gimbal ring assemblies 106, 206, or the particular hinges 108, 208, or variations thereof can be made by additive manufacturing, where typical manufacturing methods may not be capable of such intricate structures or produce low product yields. Additive (DMLM) three-dimensional kinematic link is another option for controlling the desired overall kinematic motion of the flexible portions of the joint assembly.

The gimbal joint assembly 100, 200 uniquely removes frictional interface wear surfaces and associated pressure load-dependency on rotational bending moment. The zero-backlash tunable variable-section counter-balancing flexures, such as the hinges 108, 208 create a wear-free kinematic revolute interface. A virtual kinematic revolute axis of rotation is created at the intersection of the two flexures, which defines the first and second rotational axes 150, 152 through the pairs of hinges 146, 148, 217, 218. The design also leverages existing CNC manufacturing technologies, advanced additive metal 3D print manufacture, and laser welding. Once the joint assembly 86 is pressurized, the axial load paths through the gimbal joint assembly 100 are through the optimally stiffened outer clevis supports 102, 104, 202, 204 that are formed and interwoven to cover and protect the thin-walled bellows convolutions 114. The simplified form and shape of these supports 102, 104, 202, 204 create yokes or devises that connect the two sets of oversized revolute flexural hinges 108, 208 to the gimbal ring assembly 106, 206. Compound orthogonal two degrees of freedom angular articulation loads the curved beam of the gimbal ring assembly 106, 206 with two simultaneous orthogonal moments. The load path stresses can be analyzed and optimized for minimal strain energy and mass using topological optimization.

The joint assemblies 100, 200 and their components provide a variety of benefits including a pre-loaded, compliant bellowed spherical flex joint that can have a constrained kinematic geometry and reduced reaction loading during assembly and thermal growth of high-temperature bleed-air ducting systems.

The wear-free revolute flexural hinge 108, 208 can be tuned and optimized for load carrying capability and minimal rotational moment. The hinges 108, 208 further minimize the number of parts and does not require the typical load-sensitive frictional contact between a cylindrical pin and bushing for a typical joint assembly. This variable flexure cross-section invention uniquely decouples the internal thrust loads from interfacial friction and associated wear. A tunable, consistent, and known rotational bending moment for a specific pressure load requirement is possible. The developed axial pressure thrust load is distributed between the four revolute hinges 108, 208, two for each rotational degree of freedom.

The lightweight 3D metal printed gimbal ring assembly 106, 206 is optimized for minimal mass and maximum torsional and bending stiffness. The gimbal ring assembly 106, 206 has a continuously variable cross-sectional (internal and external) geometry to maximize bending and torsional load capability between and at the revolute joint hinges 108, 208. Location and use of internal ribs, gussets, and variable wall thickness for the ring body 110, 210 can be further optimized to maximize bending and torsional load capabilities with finite element analysis. This invention can uniquely utilize 3D additive manufacturing and metal printing to efficiently transfer dynamic system loads with minimum rotational joint stiffness.

Similarly, the revolute flexural hinge 108, 208 can be tuned and optimized for strength and rotational moment. This hinges 108, 208 minimize the number of parts and does not require the typical load-sensitive frictional contact between a cylindrical pin and bushing of a typical joint assembly. The flexure hinge 108, 208 can also be printed as an integral part of the gimbal ring assembly 106, 206. The variable flexure cross-section uniquely decouples the internal thrust loads from interfacial friction and associated wear. Further, the flexure is tunable, consistent and known rotational bending moment for a specific pressure load requirement. The developed axial pressure thrust load is distributed between the four revolute joint hinges 108, 208, two for each rotational degree of freedom.

To the extent not already described, the different features and structures of the various embodiments can be used in combination as desired. That one feature is not illustrated in all of the embodiments is not meant to be construed that it cannot be, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A duct assembly comprising:
a first duct;
a second duct; and
a flexible joint assembly coupling the first duct to the second duct and comprising:
a bellows having a first end and a second end and convolutions located there between; and
a gimbaled joint assembly, comprising:
a first support surrounding the first end of the bellows and a portion of the convolutions;
a second support surrounding the second end of the bellows and a portion of the convolutions; and
a gimbal ring assembly operably coupled to the first support and the second support by a set of flexure hinges interconnected via a ring body.

2. The duct assembly of claim 1 wherein the flexible joint assembly has two rotational degrees of freedom and the first support and second support are configured to rotate relative to the gimbal ring assembly.

3. The duct assembly of claim 1 wherein the set of flexure hinges includes four spaced flexure hinges.

4. The duct assembly of claim 3 wherein the four spaced flexure hinges define a first pair of hinges and a second pair of hinges as alternately spaced flexure hinges about the ring body, with the first pair of hinges defining a first rotational axis and the second pair of hinges defining a second rotational axis.

5. The duct assembly of claim 4 wherein the first support couples to the gimbal ring assembly at the first pair of hinges and rotates about the first rotational axis.

6. The duct assembly of claim 5 wherein the second support couples to the gimbal ring assembly at the second pair of hinges and rotates about the second rotational axis.

7. The duct assembly of claim 1 wherein the first support and the second support cover different radial positions of a same convolution.

8. The duct assembly of claim 7 wherein the first support and the second support comprise first and second rings with complimentary extensions.

9. The duct assembly of claim 1 wherein the first support and the second support comprise mounting apertures configured to receive the flexure hinges.

10. The duct assembly of claim 1 wherein the ring body comprises a set of ribs defining a set of cavities.

11. The duct assembly of claim 1 wherein the set of flexure hinges and ring body are made by additive manufacturing.

12. The duct assembly of claim 11 wherein the set of flexure hinges and ring body are integrally formed.

13. A joint assembly, comprising:
a bellows having a first end and a second end and convolutions located there between; and
a gimbaled joint assembly, comprising:
a first support surrounding the first end of the bellows and a portion of the convolutions;
a second support surrounding the second end of the bellows and a portion of the convolutions; and a gimbal ring assembly operably coupled to the first support and the second support, the gimbal ring assembly comprising:
a ring body; and
a set of flexure hinges interconnected via the ring body, where each flexure hinge of the set of flexure hinges includes a radially inward extension and an exterior ring connected by a set of spokes, and where portions of the ring body are separated by the exterior ring of each flexure hinge of the set of flexure hinges.

14. The joint assembly of claim 13 wherein the gimbal ring includes a radially inward extension configured to mount to at least one of the first support or the second support, and wherein the flexure hinge further comprises a second ring and spokes configuration to couple the inward extension to the first support ring or the second support ring.

15. The joint assembly of claim 13 wherein the flexure hinge further comprises a third ring and spokes configuration surrounding the first ring and spokes configuration.

16. A joint assembly, comprising:
a bellows having a first end and a second end and convolutions located there between; and
a gimbaled joint assembly, comprising:
a first support surrounding the first end of the bellows and a portion of the convolutions;
a second support surrounding the second end of the bellows and a portion of the convolutions; and
a gimbal ring assembly operably coupled to the first support and the second support by a set of flexure hinges interconnected via a ring body.

17. The joint assembly of claim 16 wherein a flexure hinge of the set of flexure hinges comprises a cylindrical exterior having an upper ring portion and a lower ring portion and the upper ring portion and the lower ring portions are configured to rotate relative to one another.

18. The joint assembly of claim 17 further comprising an interior portion coupling the upper ring portion to the lower ring portion wherein the upper and lower ring portion rotate relative to one another about the interior portion.

19. The joint assembly of claim 18 wherein the interior portion includes two bridges to couple the upper ring portion to the lower ring portion and the interior portion to the exterior.

* * * * *